March 17, 1964 R. G. HENNESSEY 3,124,995
LIP SYNC CONTROL APPARATUS AND METHOD
FOR SOUND FILM PROJECTORS Filed Dec. 8, 1960 3 Sheets-Sheet 1

INVENTOR:
R. G. HENNESSEY
BY Homer R. Montague
ATTORNEY

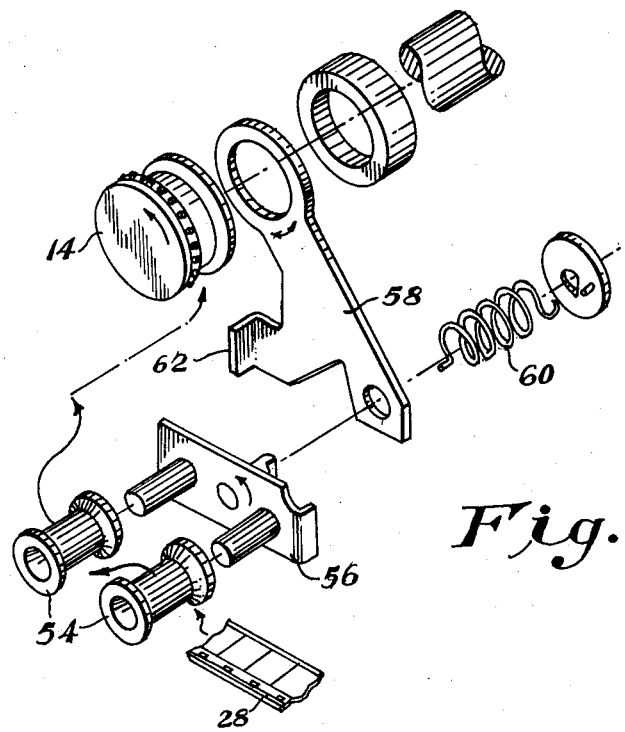
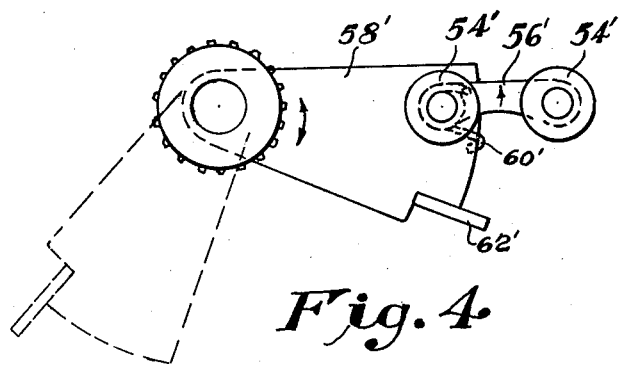

March 17, 1964
R. G. HENNESSEY
3,124,995
LIP SYNC CONTROL APPARATUS AND METHOD
FOR SOUND FILM PROJECTORS
Filed Dec. 8, 1960
3 Sheets-Sheet 3
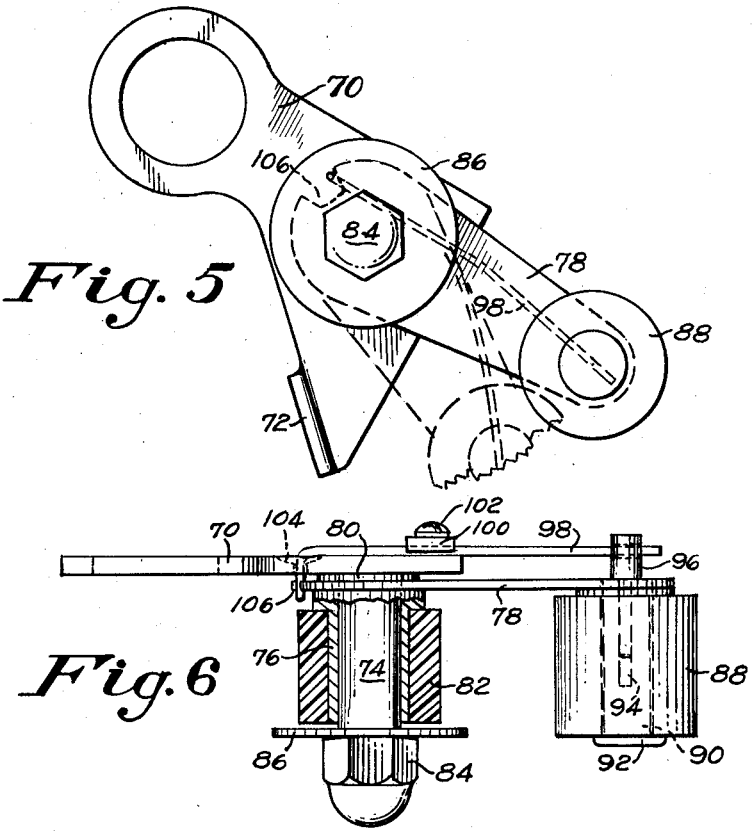
*Fig. 5*
*Fig. 6*
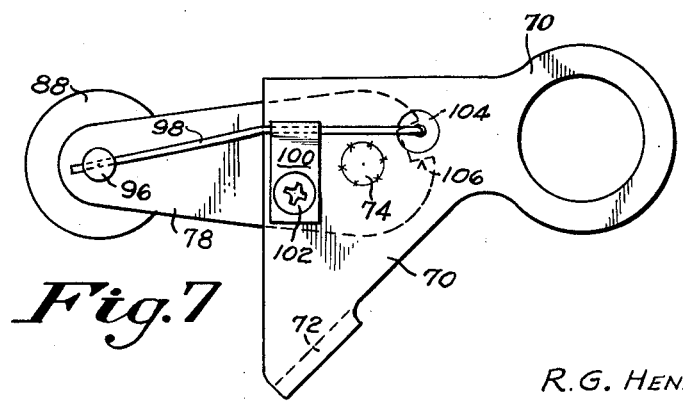
*Fig. 7*
INVENTOR:
R. G. HENNESSEY,
BY Homer R. Montague
ATTORNEY United States Patent Office 3,124,995
Patented Mar. 17, 1964

3,124,995
LIP SYNC CONTROL APPARATUS AND METHOD FOR SOUND FILM PROJECTORS
Raymond G. Hennessey, Huntington, N.Y., assignor to Fairchild Camera & Instrument Corporation, a corporation of Delaware
Filed Dec. 8, 1960, Ser. No. 74,684
16 Claims. (Cl. 88—16.2)

This invention has to do with sound-on-film motion picture projectors, and especially to improvements in such a projector by which the operator can exercise direct and immediate control over the synchronized relationship between the picture frames being projected and the sound effects simultaneously presented to the audience.

The subject-matter of the invention is to be distinguished from apparatus for achieving effective synchronization as between the sound and pictures projected by systems using separate sound and picture records. The latter involve a continuing problem of maintaining a proper time or "phase" relationship between the picture strip reproducer and the separate sound record. In the case of sound-on-film projection, with which the present invention is concerned, synchronization is automatically maintained by reason of the fact that the sound track is borne by the film strip, and thus is necessarily fed through the sound head at an average speed equivalent, in time units, to the rate at which the picture frames pass through the picture gate.

Notwithstanding the existence of inherent approximate synchronization in sound-on-film systems as just discussed, there remain several sources of possible lack of precise synchronization which can produce an annoying effect on a viewing audience. These are usually well controlled, in the production of commercial sound-on-film, so that the occurrence of slight but perceptible mis-phasing of the sound track and its appurtenant picture frames is relatively rare in the experience of movie-goers. In the case of systems adapted for amateur use, which ordinarily use less costly film of 16 mm. standard, and more especially of 8 mm. standard, there is an unfortunate concatenation of the sources of possible mis-phasing, which gives rise to the very frequent occurrence of minor (but perceptible and annoying) errors of synchronization as perceived by an audience.

It is accordingly a principal object of this invention to provide a projector for sound-on-film records, which incorporates a convenient and effective means by which the operator can make necessary adjustments in the overall synchronization of pictures and sound.

A further object of the invention is to provide a projector as described, in which the operation of the synchronization adjustment does not permit a permanent maladjustment of the desired standard offset between the picture gate and the sound reproducing head; this feature is especially important in projection apparatus intended for operation by amateurs and other relatively untutored persons.

Still another object of the invention is to devise a lip-synchronization method and an adjustment or control for sound film projectors, such that the desired adjustments can readily be effected from time to time during, and without interrupting, the projection of a film. A desirable result of this feature is that the operator is able to observe the immediate result of his adjustment, in terms of the synchronization as actually perceived by the audience, whereby the adjustment can be rendered immediately effective regardless of the particular cause which produced the original unsynchronized effect thus being eliminated. A further desirable result of this feature is that several successive instances of poor lip synchronization in a given reel can readily be corrected on an individual basis, and regardless of the particular direction of synchronization errors and of the particular ultimate causative factors which produced them.

Another object of the invention is to provide apparatus as described above, and in which the operation of the lip synchronization control cannot result in physical damage to the films being reproduced.

The invention accomplishes the above and other objects and advantages by combining, with sound-on-film projector apparatus of conventional type, a device and a method by which the effective separation between the instant of projection of a film frame, and the instant of reproduction of its appurtenant sound record portion, can be nicely adjusted during the projection operation. More specifically, and in the preferred embodiments, this adjustment is effected by changing the amount of film which lies in a loop path between the picture gate and the sound head; as by a set of movable compliance rollers whose position can be adjusted to control the distribution of film as between a location ahead of the sound head (and following the picture gate) and a location following the sound head.

Another object is to support the compliance rollers between the sound head and the take-up sprocket in such a manner that the film passes thereover in an S-loop, to provide tension therein for isolating the film being fed past the sound head against the sprocket tooth flutter.

Still another object is to locate the compliance rollers in a film loop between the sound head and the take-up sprocket in such a manner that adjustment of the position of the compliance rollers will change the length of film between the picture gate and the sound head on the opposite side of the sound head from that of the compliance rollers.

The invention will readily be understood by those familiar with the art, from the following detailed specification of preferred embodiments thereof, taken in connection with the appended drawings in which:

FIG. 3 is an exploded perspective view of portions of the same structure particularly related to the invention.

FIG. 4 is a fragmentary view in elevation of a variant form of the inventive structure.

FIG. 5 is a front elevation view of a further modification of the compliance roller assembly.

FIG. 6 is a top view of the same, with parts shown in section.

FIG. 7 is a rear elevation view of this modification.

Figure 1:
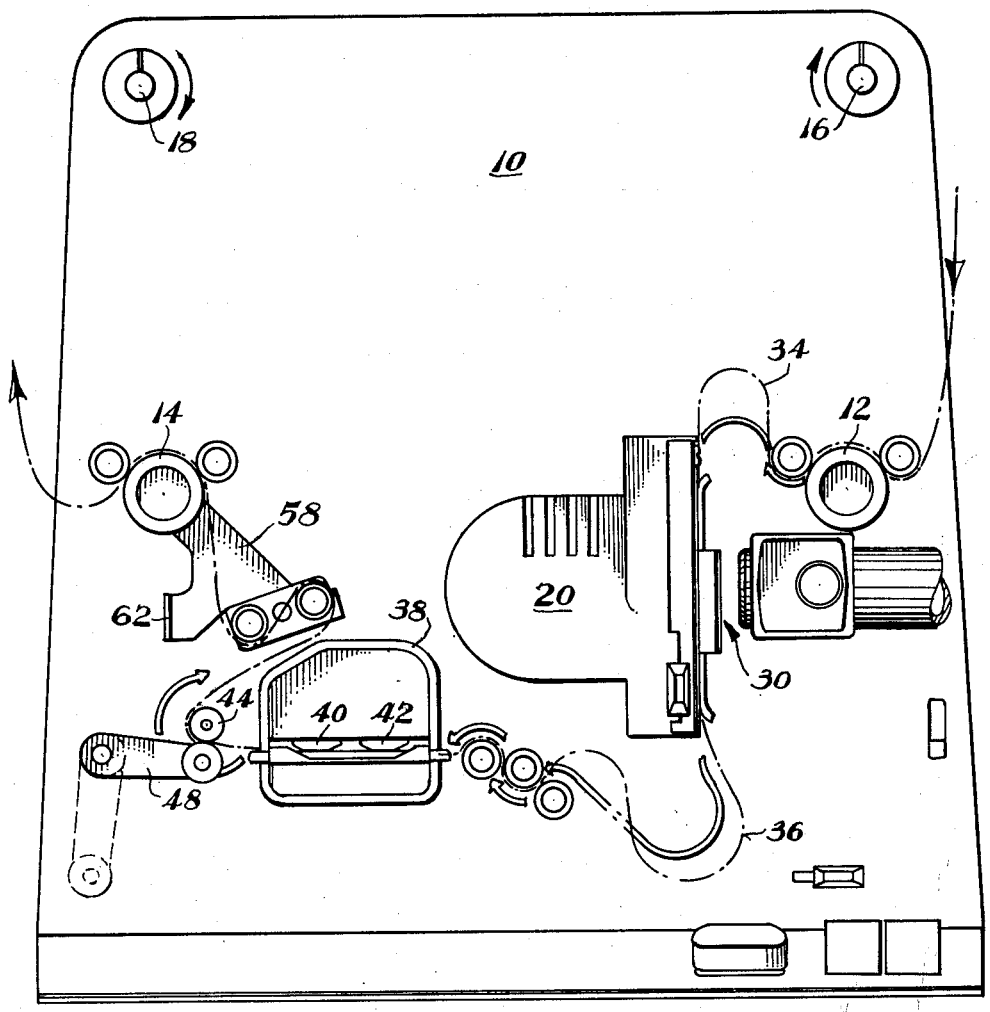
FIG. 1 is a side elevation of a motion picture and sound projector incorporating the invention.

Referring first to FIG. 1 of the drawings, there is shown in side elevation a sound motion picture projector incorporating the invention. The housing 10 of the projector contains the usual drive motor (not shown) for driving film sprockets 12 and 14 toothed to positively engage with, and thereby to feed, the edge-perforated film at a constant (though usually adjustable) speed from a supply reel to a take-up reel. These reels are not shown, but are removably keyed to a supply reel shaft 16 and a take-up reel shaft 18 respectively, driven as by slipping belts and pulleys from the same motor that drives the sprockets. The motor may also power a cooling fan to drive air through a lamphouse 20 to remove the excess heat developed by the projection lamp 22 (see FIG. 2) which, in cooperation with the usual projection lens 26, projects onto a suitable screen the successive frames or pictures on film strip 28. A picture gate 30, which may also be conventional, holds the film in position at the projection location, and a film feeding means of conventional type (indicated schematically as a pull-down claw 32 in FIG. 2) is driven in synchronism with sprockets 12 and 14. Thus, as is well known in the art, the average speed of passage of film from sprocket 12 to sprocket 14 is kept constant, even though between said sprockets the film may have an intermittent or stop-start motion at gate 30 to allow each frame to remain stationary for an instant during which the usual shutter opens to allow the image on that frame to be screened. In threading the projector, usual excess or loose "loops" as at 34 and 36 are established before and following gate 30, to allow for the stop-start film motion despite the continuous (non-intermittent) rotation of sprockets 12 and 14.

The projector with which the present invention is concerned also includes means for reproducing sound to accompany the picture projection, for example from a magnetic sound track provided along one edge of film 28. To this end, a conventional sound head unit 38 is mounted on housing 10 at a position following film gate 30 in the film path, and may contain for example a record-reproduce head 40 and an erase head 42, through or adjacent which the film is normally drawn at a constant speed equal to that produced by sprockets 12 and 14. To ensure smooth constant-speed passage of the film through the sound head unit, a friction drive high-inertia capstan roller 44 is positioned following this unit, the film wrapping partially about this capstan and being held, if desired, against it by a pressure roller 46 carried by an arm 48 spring-urged toward the capstan. An over-center spring may be employed, to allow arm 48 to be retracted to the dotted line position for ease of threading.

Figure 2:
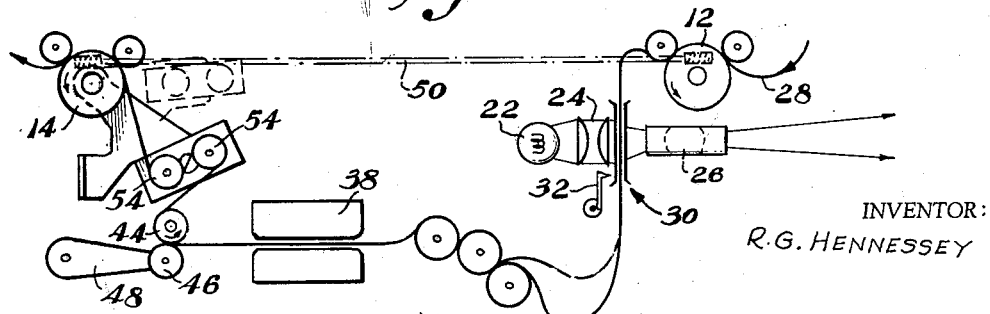
FIG. 2 is a schematic partial view, to a larger scale, showing the operating principles of the invention.

As indicated in FIG. 2, sprockets 12 and 14 may be positively interconnected by a drive shaft 50 driven from the motor, the shaft carrying worms for engagement with worm wheels fast to the sprocket shafts. The capstan itself is preferably constructed so as to have a large flywheel effect for smooth film drive at the sound head, but is rotated only by reason of the passage of film in contact therewith.

As is standard practice in sound film apparatus, the picture gate 30 and the sound head (or sound gate) 38 are spaced apart along the film path, not only for mechanical convenience, but to allow the sound reproduction to be accomplished at a point where the film travel is steady and uniform, free from flutter or fluctuations of speed caused by its intermittent motion at the picture gate. In the case of amateur films as small as the nominal 8 millimeter width, the effective separation between picture and sound gate may be from (say) 45 to 60 frames, there being a number of frames per foot nearly inversely proportional to the film width. The actual number of frames represented by this displacement clearly depends not only on how the film is threaded in the projector (that is, the size of loop 36), but also upon the threading of the camera in which the film was exposed to visual images and sound signals. In the case of sound signals dubbed onto film 28 during its optical projection (as readily feasible with magnetic-record film strips), the sound and picture displacement during such recording operation will depend on the threading of the film in a like manner.

During projection of such a film, however prepared, it will rarely happen that the sound, particularly speech, being momentarily reproduced, will correspond to, or "sync" with, the particular frame then being optically projected. With the frame comprises a close up showing lip movement, for example, the lack of synchronism may be annoyingly apparent. The present invention provides an adjustment available to the operator, during actual screening of the film, for adjusting the projector to a perfectly synchronized condition.

The invention accomplishes this aim by controlling the effective film length extending from picture gate 30 to sound head 40; specifically, by altering the loop 36 existing in that region. Since sprockets 12 and 14, and the positive film feed in gate 30, are positively geared together, the invention makes the adjustment by controlling the distribution of film as between locations ahead of, and following, sound head unit 38.

Precise synchronization of sound and picture is accomplished by the provision of a pair of compliance rollers 54, 54 mounted on a support 56 which is pivoted at its central portion on arm 58 and spring loaded by spring 60 to provide compliance between the take-up sprocket 14 and inertia capstan 44. The arm 58 is pivotally mounted about the axis of the take-up sprocket 14 and positions the compliance rollers 54, 54 between the capstan 44 and the take-up sprocket 14 so that they form an S-shaped loop in the film to provide tension therein for isolating the film being fed past the sound head against sprocket tooth flutter. Tab 62 on arm 58 provides means for manually adjusting the bodily position of the compliance rollers 54, 54 about the axis of the take-up sprocket 14. Spring 60 permits the position of support 56 carrying the compliance rollers 54, 54 to vary relative to arm 58 during adjusting movement of said arm, and thus provides for easy movement of said arm during manipulation thereof.

Adjustment of the rollers 54, 54 in one direction forms a larger loop of film between the capstan 44 and the take-up sprocket 14, and hence necessarily reduces the length of film in the loop between the picture gate and the sound head; the length of film between the picture gate 30 and the take-up sprocket 14 being constant during the entire operation of the projector due to the positive feeding of the film by the pull-down claw 32 at the picture gate and positive feeding of the film at the take-up sprocket 14 by the sprocket teeth. Thus the adjustment of the compliance rollers 54, 54 causes the amount of film to be altered on opposite sides of the sound head since the film is not positively driven at the sound head. Adjustment of the compliance rollers 54, 54 in an opposite direction results in the formation of a smaller loop of film between the capstan 44 and the take-up sprocket 14, and hence necessarily increases the length of film in the loop between the picture gate and the sound head for the reasons stated above.

Merely adjusting the position of the compliance rollers 54, 54 by manual operation of the tab 62 on arm 58, in one direction or the other, produces a variation in the length of film in the loop between the picture gate and the sound head. With this construction, it is a simple matter to accurately and quickly synchronize the pictures being projected with their associated sound during the time that the pictures and sound are actually being reproduced. Arm 58 is friction loaded to hold it in any desired position of adjustment.

The compliance rollers 54, 54 provide a structure which performs two useful functions, (1) they adjust the length of film between the picture gate and sound head to precisely synchronize the pictures and their associated sound, and (2) they isolate the film being fed past the sound head against sprocket tooth flutter.

In the variant form shown in FIG. 4, the compliance rollers 54', 54' are mounted on a support 56' which is pivoted at one end to the arm 58'. The two-roller assembly 54', 54', is spring loaded by spring 60' to provide compliance between the take-up sprocket 14 and the capstan 44. In all other respects this variant form operates in the same manner as described above.

FIGS. 5, 6 and 7 show, to a larger scale, a particularly advantageous embodiment of the compliance-roller assembly, wherein the compliance spring itself performs multiple functions. As shown in front elevation in FIG. 5, the arrangement comprises the adjustment arm 70, again arranged for mounting about the axis of the take-up sprocket 14 (of FIG. 1) with frictional control so as to remain at the angle to which it is set when the operator manipulates it by the thumb piece 72 which is conveniently a turned-up lug on the arm body. A stub axle 74 is riveted or staked to the body of arm 70 (see the rear view of FIG. 7) and rotatably supports the bushing 76 which is riveted or staked to the tilting link 78 whereby the outer end of the latter can swing through the necessary arc to accomplish the compliance function. A loose washer 80 about stub shaft 74 spaces the link 78 from arm 70, and compliance roller 82 is freely rotatable about bushing 76. A nut 84 is threaded upon the outer end of stub axle 74 and pulls an oversize washer 86 against a shoulder near the end of the axle, positioned so that roller 82 is left free to turn on bushing 76.

At the outer end of tilting link 78, the second compliance roller 88 is carried for free rotation on a stub axle 90, and held in place by a headed portion 92 of the axle, or a securing screw threaded therein. A bore 94 is formed in the axle 90 opening at the end secured to link 78, and loosely receives the reduced shank portion of a pin 96 whose larger head portion is transversely drilled to receive one end of the compliance spring 98 which in this form is a simple length of spring wire secured in place on the rear side of adjustment arm 70 as by a clamp 100 held on the arm by screw 102.

At its left-hand end, as viewed in FIG. 6, spring 98 is bent forward at a right angle to extend through arm 70 by way of a hole therein, the hole being preferably relieved as at 104 to accommodate the bending radius of the spring wire. The terminal portion of spring 98 extends sufficiently far through arm 70 as to lie within a slotted portion 106 of link 78, and thus forms a positive stop for the motion of link 78. Spring 98 permits motion of link 78 from its normal position shown in full lines to the maximum deflected position as indicated for example in dash lines in FIG. 5.

It will be observed that spring 98 not only performs the compliance function required of rollers 82 and 88, but at one end it forms the desired limit stop for the rotation of link 78 by cooperating with slot 106. The loose fit of spring 98 in pin 96 prevents any possibility of binding as link 78 rotates.

The present invention provides an extremely simple and precise device and method for accurately synchronizing the pictures and the sounds associated therewith while the sound motion picture film is being reproduced, and thus permits correction during reproduction for any improper synchronization of the pictures and sound regardless of its cause, such for example; as where several films which had different length film loops in the camera when the pictures and sounds were originally recorded are spliced together for reproduction; or where the source of the sound recorded on the film was at a distance of, say 50 feet or more, from the camera when the picture of the sound source and the sound therefrom was recorded on the film, or for any one or more of other reasons which cause improper synchronization of the reproduced pictures and sound.

It is to be understood that the invention is not limited to the embodiments and modifications described in the foregoing, but is susceptible of various other adaptations and applications within the scope of the following claims.

What is claimed is:

1. A sound motion picture apparatus comprising; a picture gate and a sound head spaced therefrom, means for feeding a sound motion picture film past said picture gate and sound head with a loop between said picture gate and said sound head, including a capstan for smoothly feeding the sound motion picture film past the sound head and a sprocket for feeding the sound motion picture film beyond the capstan, a movably mounted member contacting said sound picture film between said capstan and said sprocket, and means for adjusting the position of said movably mounted member for varying the length of sound motion picture film between said capstan and said sprocket and inversely varying the length of sound motion picture film in the loop between said picture gate and sound head in order to correct for any improper synchronization of the pictures being projected and the sound being reproduced.

2. A sound motion picture apparatus comprising; a picture gate and a sound head spaced therefrom, means for feeding a sound motion picture film past said picture gate and sound head with a loop between said picture gate and said sound head, including a capstan for smoothly feeding the sound motion picture film past the sound head and a sprocket for feeding the sound motion picture film beyond the capstan, and a movably mounted member having a support pivotally mounted thereon carrying a pair of film engaging rollers which are spring loaded to provide compliance between said sprocket and said capstan positioned in the film path between said sound head and said sprocket.

3. In a sound motion picture projecting and reproducing machine, the combination with a picture projecting mechanism and a sound head, and a continuous sound motion picture film, of an adjustable film loop formed between said picture projecting mechanism and said sound head, and means engaging the film and located in the film path beyond the said sound head for adjustably varying the length of film in said film loop in order to alter the relationship between the pictures being projected and the sound being reproduced.

4. A sound motion picture projecting and reproducing machine comprising, delivery reel, a take-up reel, a picture gate, a sound head spaced from said picture aperture, means for feeding a sound motion picture film from the delivery reel to the picture gate and the sound head and thence to the take-up reel at the same rate of feed with a loop of film between the picture gate and the sound head, a member engaging the film between the means for feeding the film from the delivery reel and to the take-up reel, and means for adjusting the position of said member to vary the length of the film in the loop between the picture gate and the sound head while the images on the film are being projected on a screen and the sound corresponding thereto is being reproduced.

5. A sound motion picture reproducing apparatus including a picture gate and a sound head spaced therefrom, means for feeding a motion picture film past said picture gate and sound head with a film loop between said picture gate and sound head, and a manually movable member engaging the film at an adjustable position beyond said sound head for varying the length of film in the film loop, in order to correct for any improper synchronization of the pictures being projected and the sound being reproduced.

6. Sound motion picture reproducing apparatus for synchronizing the sound and pictures on a sound motion picture film during reproduction including a picture gate, a sound head and a sprocket for feeding the sound motion picture film beyond the sound head, which comprises; means for forming a first loop of film between said picture gate and said sound head, means for forming a second loop of film between said sound head and said sprocket, means for engaging the film in the second loop, and manually adjustable means to vary the position of the means for engaging the film in the second loop to change the length of film in the second loop and thus also change the length of film in the first loop and thereby correct for any improper synchronization of the pictures and sound being reproduced.

7. Sound motion picture reproducing apparatus for synchronizing the sound and pictures on a sound motion picture film during reproduction which comprises; a picture gate and a sound head spaced therefrom, a sprocket for feeding the sound motion picture film beyond the sound head, means for forming a first loop of film between said picture gate and said sound head, means for forming a second loop of film between said sound head and said sprocket, and adjustable means engaging the film in said second loop for varying the length of film in said first loop between said picture gate and said sound head.

8. A sound motion picture device comprising a picture gate and a sound head spaced therefrom, means for feeding a sound motion picture film past said picture gate and sound head with a loop between said picture gate and sound head including a sprocket for feeding said sound motion picture film beyond the sound head, a member contacting said sound motion picture film in the film path between said sound head and said sprocket, and manually operable means for adjusting the position of said member for varying the length of sound motion picture film between the sound head and the sprocket and inversely varying the length of sound motion picture film in the loop between said picture gate and sound head in order to correct for any improper synchronization of the picture being projected and the sound being reproduced.

9. A sound motion picture device comprising a picture gate and a sound head spaced therefrom, means for feeding a sound motion picture film past said picture gate and sound head with a loop between said picture gate and sound head including a sprocket for feeding said sound motion picture film beyond the sound head, a member pivotally mounted about the axis of the sprocket contacting said sound motion picture film in the film path between said sound head and said sprocket, and means for adjusting the position of said member for varying the length of sound motion picture film between the sound head and the sprocket and inversely varying the length of sound motion picture film in the loop between said picture gate and sound head in order to correct for any improper synchronization of the picture being projected and the sound being reproduced.

10. A sound motion picture device comprising a picture gate and a sound head spaced therefrom, means for feeding a sound motion picture film past said picture gate and sound head with a loop between said picture gate and sound head including a sprocket for feeding said sound motion picture film beyond the sound head, a member having a pair of rollers over which the film is fed in an S-loop positioned in the film path between said sound head and said sprocket, and means for adjusting the position of said member for varying the length of sound motion picture film between the sound head and the sprocket and inversely varying the length of sound motion picture film in the loop between said picture gate and sound head in order to correct for any improper synchronization of the picture being projected and the sound being reproduced.

11. A sound motion picture device comprising a picture gate and a sound head spaced therefrom, means for feeding a sound motion picture film past said picture gate and sound head with a loop between said picture gate and sound head including a sprocket for feeding said sound motion picture film beyond the sound head, a member having a pair of rollers between which the film is fed positioned in the film path between said sound head and said spocket, and means for adjusting the position of said member for varying the length of sound motion picture film between the sound head and the sprocket and inversely varying the length of sound motion picture film in the loop between said picture gate and sound head in order to correct for any improper synchronization of the picture being projected and the sound being reproduced.

12. A sound motion picture device comprising a picture gate and a sound head spaced therefrom, means for feeding a sound motion picture film past said picture gate and sound head with a loop between said picture gate and sound head including a sprocket for feeding said sound motion picture film beyond the sound head, a member having a support pivotally mounted at its central point thereto and carrying a pair of film engaging rollers positioned in the film path between said sound head and said sprocket, and means for adjusting the position of said member for varying the length of sound motion picture film between the sound head and the sprocket and inversely varying the length of sound motion picture film in the loop between said picture gate and sound head in order to correct for any improper synchronization of the picture being projected and the sound being reproduced.

13. A sound motion picture device comprising a picture gate and a sound head spaced therefrom, means for feeding a sound motion picture film past said picture gate and sound head with a loop between said picture gate and sound head including a sprocket for feeding said sound motion picture film beyond the sound head, a member having a support pivotally mounted at one end thereof to the member and carrying a pair of film engaging rollers positioned in the film path between said sound head and said sprocket, and means for adjusting the position of said member for varying the length of sound motion picture film between the sound head and the sprocket and inversely varying the length of sound motion picture film in the loop between said picture gate and sound head in order to correct for any improper synchronization of the picture being projected and the sound being reproduced.

14. A sound motion picture device comprising a picture gate and a sound head spaced therefrom, means for feeding a sound motion picture film past said picture gate and sound head with a loop between said picture gate and sound head including a sprocket for feeding said sound motion picture film beyond the sound head, a member having a support pivotally mounted thereon and carrying a pair of film engaging rollers positioned in the film path between said sound head and said sprocket, and means for adjusting the position of said member for varying the length of sound motion picture film between the sound head and the sprocket and inversely varying the length of sound motion picture film in the loop between said picture gate and sound head in order to correct for any improper synchronization of the picture being projected and the sound being reproduced.

15. A sound motion picture device comprising a picture gate and a sound head spaced therefrom, means for feeding a sound motion picture film past said picture gate and sound head with a loop between said picture gate and sound head including a sprocket for feeding said sound motion picture film beyond the sound head, a member having a support pivotally mounted thereon carrying a pair of film engaging rollers which are spring loaded to provide compliance between said sprocket and said sound head positioned in the film path between said sound head and said sprocket, and means for adjusting the position of said member for varying the length of sound motion picture film between the sound head and the sprocket and inversely varying the length of sound motion picture film in the loop between said picture gate and sound head in order to correct for any improper synchronization of the picture being projected and the sound being reproduced.

16. A sound motion picture device comprising a picture gate and a sound head spaced therefrom, means for feeding a sound motion picture film past said picture gate and sound head with a loop between said picture gate and sound head including a sprocket for feeding said sound motion picture film beyond the sound head, a member pivotally mounted about the sprocket axis having a support pivotally mounted thereon, carrying a pair of film engaging rollers which are spring loaded to provide compliance between said sprocket and said sound head positioned in the film path between said sound head and said sprocket, and means for adjusting the position of said member for varying the length of sound motion picture film between the sound head and the sprocket, and inversely varying the length of sound motion picture film in the loop between said picture gate and sound head in order to correct for any improper synchronization of the picture being projected and the sound being reproduced.

References Cited in the file of this patent

UNITED STATES PATENTS

| | | |
|---|---|---|
| 1,981,069 | Ramsey | Nov. 20, 1934 |
| 2,322,369 | Lackoff et al. | June 22, 1943 |
| 2,459,628 | Descombes | Jan. 18, 1949 |
| 2,685,417 | Bartelson | Aug. 3, 1954 |
| 2,729,454 | Vides | Jan. 3, 1956 |
| 2,819,646 | Hyman | Jan. 14, 1958 |

FOREIGN PATENTS

| | | |
|---|---|---|
| 966,125 | Germany | July 11, 1957 |